United States Patent [19]
Doi et al.

[11] Patent Number: 5,152,335
[45] Date of Patent: Oct. 6, 1992

[54] AUTOMOBILE AIR CONDITIONING SYSTEM WITH COOL AIR BYPASS PASSAGE HAVING MANUAL CONTROL MODE

[75] Inventors: Shigetoshi Doi, Iwakuni; Tsutomu Fujiki, Aki, both of Japan

[73] Assignee: Mazda Motor Corporation, Hiroshima, Japan

[21] Appl. No.: 719,709

[22] Filed: Jun. 26, 1991

[30] Foreign Application Priority Data

Jun. 26, 1990 [JP] Japan ................ 2-167977

[51] Int. Cl.⁵ .......................................... F25B 29/00
[52] U.S. Cl. ............................... 165/24; 165/25; 165/16; 165/42; 165/43; 236/91 E; 236/91 F; 236/13; 236/49.3; 454/75; 454/156; 62/244
[58] Field of Search ............ 165/16, 22, 42, 43, 165/24, 25; 98/2.01, 2.11; 236/91 E, 91 F, 13, 49.3; 62/244; 454/75, 156

[56] References Cited

U.S. PATENT DOCUMENTS

| | | | |
|---|---|---|---|
| 4,408,712 | 10/1983 | Naganoma et al. | 165/43 |
| 4,478,274 | 10/1984 | Naganoma et al. | 165/42 |
| 4,523,715 | 6/1985 | Ohsawa et al. | 165/43 |
| 4,685,508 | 8/1987 | Iida | 165/43 |
| 4,791,981 | 12/1988 | Ito | 98/2.11 |
| 4,953,630 | 9/1990 | Iida | 98/2.01 |
| 4,962,302 | 10/1990 | Katsumi | 165/42 |
| 4,966,011 | 10/1990 | Iida | 165/42 |
| 4,966,012 | 10/1990 | Iida | 165/42 |
| 4,994,958 | 2/1991 | Iida | 165/43 |

FOREIGN PATENT DOCUMENTS 0293218  11/1989  Japan .................. 98/2.11

*Primary Examiner*—John K. Ford
*Attorney, Agent, or Firm*—Fleit, Jacobson, Cohn, Price, Holman & Stern

[57] ABSTRACT

An automobile air conditioning system has a bypass air passage for directing air, before it is heated, to a car interior via a vent outlet. A bypass door is disposed in the bypass air passage, which has an opening which is automatically controlled according to a desired air conditioning temperature in an automatic air conditioning mode. The bypass door control can be intentionally changed to a mild control mode, in which the opening of the bypass door is automatically controlled to become smaller as the temperature of air, which either is in the bypass passage or is to be introduced into the bypass passage, becomes lower in a predetermined range of temperatures.

9 Claims, 3 Drawing Sheets

AUTOMOBILE AIR CONDITIONING SYSTEM WITH COOL AIR BYPASS PASSAGE HAVING MANUAL CONTROL MODE

The present invention relates to an automobile air conditioning system and, more particularly, to an air conditioning system having an air-bypass passage for allowing air to bypass a heater core to, for example, a vent outlet so as to regulate the temperature of air blowing off towards the heads of car occupants.

BACKGROUND OF THE INVENTION

1. Field of the Invention

Typically, an automobile air conditioning system has an air-bypass passage which allows air to bypass a heater core and flow into a vent outlet so as to direct air, which has been passed through an evaporator, towards the heads of car occupants. Supplying cool air to a region around the head or heads of an occupant or occupants, while heating is in operation, often provides the occupant with a comfortable air conditioned state. The provision of such an air-bypass passage is intended to produce a comfortable air conditioned state known as a "cool head-warm feet" air conditioned state. Clearly, in such a state, the occupants of the vehicle feel cool around their heads and warm around their feet. The air-bypass passage is accompanied by a bypass door, which opens and closes so as to change a cross-sectional area of the air-bypass passage and thereby blow off air, desirably regulated in temperature and quantity, towards the occupants' heads. This provides the occupants with a comfortable air conditioned feeling.

In particular, the bypass door is conventionally controlled to fully open and blow off cool air towards the head region when the temperature of blowing air is higher than a given temperature of blowing air and when an interior of the vehicle is at temperatures lower or higher than a selected air conditioning temperature. Such an air conditioning system is known from, for example, Japanese Unexamined Patent Publication No. 63-34216.

2. Description of Related Art

In the air conditioning system described in the Japanese publication mentioned above, because the air-bypass door always opens fully whenever both of the conditions referred to are established, a large quantity of cool air often blows off at once towards the head region of the occupant or occupants, so as to decrease suddenly the temperature of air in this region, particularly when the exterior of the vehicle is at low temperatures. Consequently, in this condition, the occupants may become uncomfortable. This is also true even if the air-bypass door is intentionally opened.

Automatic continuous controlling of the bypass door according to changes in temperature of air around the head region could be considered. However, in this case, it is impossible to increase and decrease the quantity of bypass air according to passenger desire.

SUMMARY OF THE INVENTION

The primary object of the present invention is to provide an automobile air conditioning system which prevents occupants in the vehicle from feeling discomfort due to cool air being blown towards their heads but otherwise satisfies air conditioning demands of the occupants.

In order to achieve the above object, the present invention provides an automobile air conditioning system in which the position of a bypass door is automatically changed according to temperatures of air introduced into an air-bypass passage when cool air is required to blow off towards the passenger head region of the automobile interior. Specifically, the present invention is formed by a main air-passage, an air-bypass passage branching off from the main air-passage and a bypass door disposed in the air-bypass passage. The main air-passage introduces air into the air conditioning system and blows off the air, after regulating the air temperature by cooling means and heating means, to the interior of vehicle through an air outlet. The air-bypass passage branches off from the main air-passage, upstream of the heating means, and leads directly to the air outlet of the main air passage so as to blow off the air introduced into the main air-passage directly towards the passenger head region of the automobile interior. The control door in the air-bypass passage opens and closes so as to change the quantity of direct flow of air in the air-bypass passage.

The control door is operated in two automatic ways, such as in an automatic normal control mode, wherein the air conditioning system automatically air conditions, and in an automatic mild control mode, wherein the bypass door opens and closes according to temperatures of air in the air bypass passage. The bypass door is controlled to make its opening smaller as a temperature introduced in the bypass passage in a predetermined range of temperatures lowers in the automatic mild control mode.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figure 1:
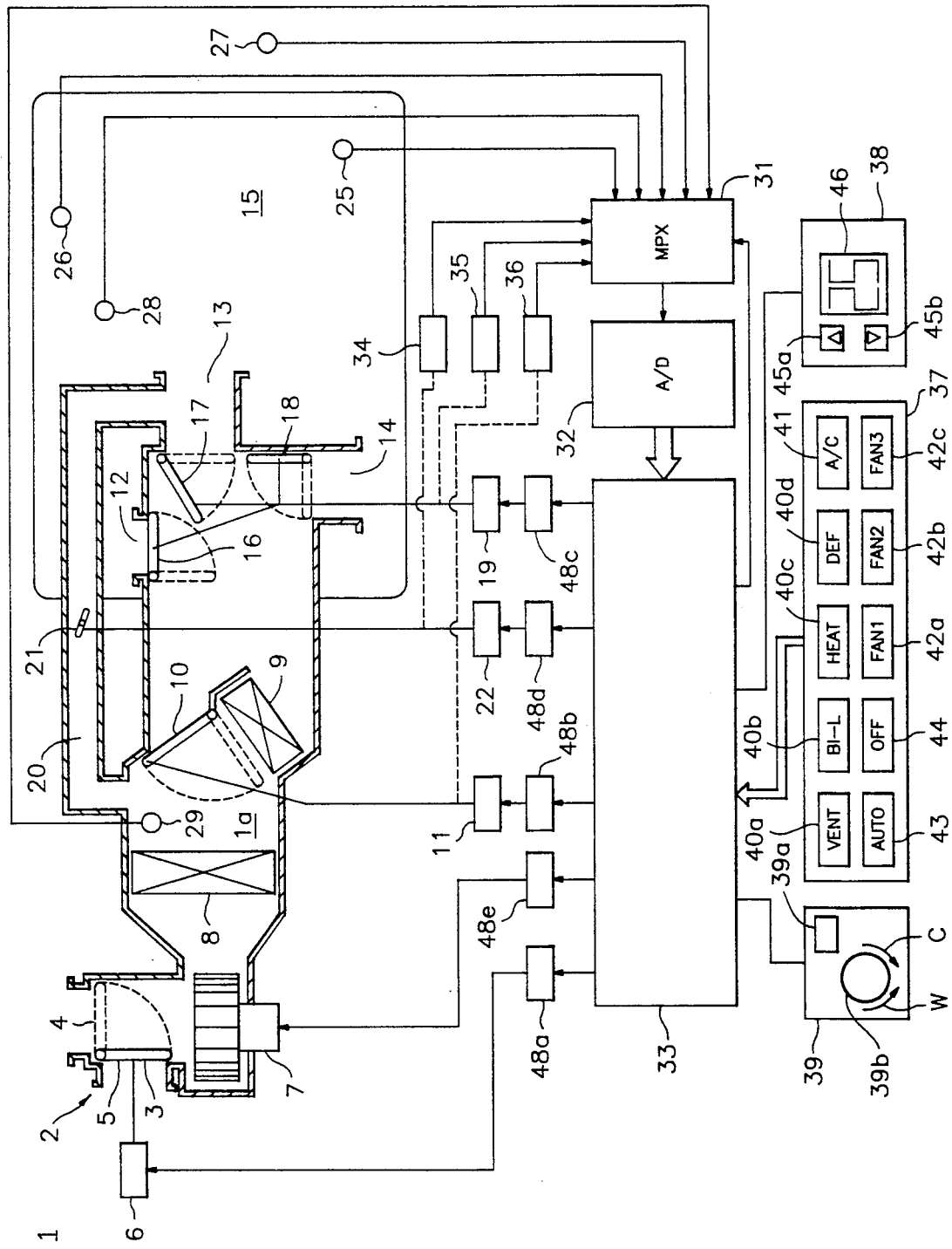
FIG. 1 is a schematic illustration of an automobile air conditioning system in accordance with a preferred embodiment of the present invention.

Referring to the drawings in detail and, in particular, to FIG. 1, an automobile air conditioning system 1 according to a preferred embodiment of the present invention is shown. The air conditioning system comprises a main air passage 1a and a two-way intake device 2, disposed at an upstream end of the main air passage 1a. The two-way intake device 2 is equipped with an internal air inlet 3 and an external air inlet 4. An internal-external air intake mode changeover door 5 is positioned at the boundary between the inlets 3 and 4. Intake air passing into the air passage 1a can be selected to be internal i.e., recirculated, air or external air by operating this internal-external air change door 5 by means of an actuator 6.

Main air passage 1a is provided from the upstream end with a blower or fan 7, an evaporator 8 and heater core 9. The fan 7 draws air in the main air passage 1a, upstream to downstream, towards the evaporator 8. The evaporator 8, together with a compressor (not shown), constitutes a refrigeration cycle which cools the air drawn into the passage 1a. Engine cooling water circulates, passing through the heater core 9 to heat air passing through the heater core 9. An air mixing door 10, located adjacent to the heater core 9, has its opening controlled by an actuator 11 so as to regulate the ratio of quantities of air passing through and bypassing the heater core 9, thereby regulating the temperature of air delivered in the vehicle. A full cooling condition and a full heating condition are provided when the opening of the air mixing door 10 is 0% (shown by broken lines in FIG. 1) and when the opening of the air mixing door 10 is 100% (shown by full lines in FIG. 1), respectively.

A downstream end portion of the main air passage 1a branches off into a defroster outlet 12, a vent outlet 13 and a heat outlet 14, all of which open into the interior 15 of the vehicle. The vent outlet 13 constitutes an air flow outlet through which air is vented towards the head region of the interior 15. Mode control doors 16, 17 and 18 are located at the outlets 12, 13 and 14, respectively, and are operated by an actuator 19 to open and close and provide any desired air flow mode. An air bypass passage 20 branches off from the main air passage 1a between the evaporator 8 and the air mixing door 10. The air bypass passage 20 joins the vent outlet 13 so as to allow a portion of air passed through the evaporator 8 to bypass the heater core 9 and to be discharged from the vent outlet 13. The air bypass passage 20 is provided with a bypass door 21, having an opening which is regulated by an actuator 22 so as to regulate the quantity of cold air directly supplied to the vent outlet 13 via the air bypass passage 20.

The air conditioning system 1 has various sensors, such as an interior temperature sensor 25, installed in an instrument panel (not shown), for detecting the temperature Tr of air inside the vehicle, a head temperature sensor 26, attached to a roof panel of the vehicle, for detecting the temperature Trh of air near a roof of the vehicle, an exterior temperature sensor 27 for detecting the temperature Ta of air outside the vehicle, a solar radiation detector 28 for detecting the quantity of solar radiation Ts against the vehicle, and an evaporator output temperature sensor 29, disposed directly downstream of the evaporator 8, for detecting the temperature Te of air passed through the evaporator 8. Output signals of these sensors 25, 26, 27, 28 and 29 are input into a multiplexer 31 and, after conversion into digital signals by an A/D converter 32, input to a system control means, which comprises a microcomputer 33 having CPU, RAM and ROM as is well known in the art.

The air conditioning system 1 further has various sensors, such as an opening sensor 34 for detecting operated openings of the bypass door 21, a position sensor 35 for detecting operated positions of the mode control doors 16, 17 and 18, and an opening sensor 36 for detecting operated openings of the air mixing door 10. Output signals of the sensors 34-36 are input to the microcomputer 33 via the multiplexer 31 and A/D converter 32.

The microcomputer 33 receives, in addition to the signals from the sensors 25-29 and 34-36, output signals from a control panel 37, an air conditioning temperature setting device 38 and a head temperature control device 39.

Control panel 37 is furnished with mode switches 40a-40d for manually setting air flow, respectively, to a ventilation mode (VENT), a bi-level mode (BI-L), a heat mode (HEAT), and a defroster mode (DEF). The control panel 37 is further furnished with various switches, such as an air conditioning (A/C) switch 41 for effecting a refrigeration cycle, fan switches 42a-42c, which change the speed of rotation of the fan 7 to a low speed (FAN 1), a medium speed (FAN 2) and a high speed (FAN 3), an automatic air conditioning (AUTO) switch 43, which is operated to provide a completely automatic operation of the air conditioning system 1, and a stop (OFF) switch 44 for stopping the air conditioning system.

Air conditioning temperature setting device 38 comprises an up-setting (UP) switch 45a, a down-setting (DOWN) switch 45b for setting a desired air conditioning temperature and a display unit 46 to display the air conditioning temperature set through the up-setting and down-setting switches 45a and 45b. The air conditioning temperature can be changed upward and downward within a predetermined range of temperatures.

Head temperature control device 39 is furnished with a mild control switch 39a and a temperature regulation dial 39b. The mild control switch 39a, which may be a push on-push off button switch, is pressed when the occupants desire to change the air conditioning system to a mild control mode, in which the flow rate of cold air towards the head region can be automatically regulated, depending upon the temperature of air introduced into the bypass passage. The temperature regulation dial 39b, which becomes available when the mild control mode has been established by pushing on the mild control switch 39a, readjusts the opening of the bypass door 21. The up-setting and down-setting switches 45a and 45b of the air conditioning temperature setting device 38 and the temperature regulation dial 39b may be of a well-known type having a sliding lever.

Figure 3:
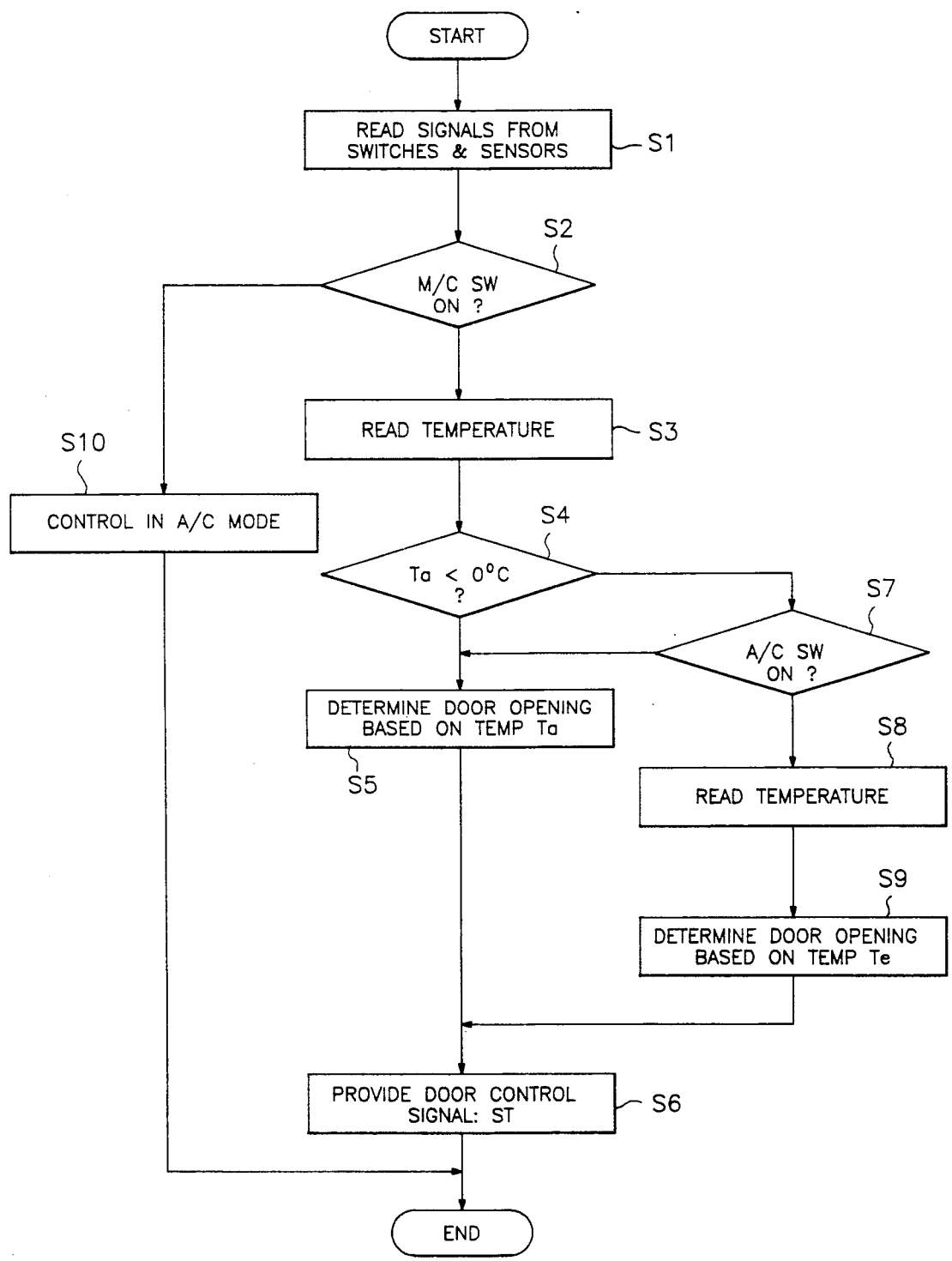
FIG. 3 is a graph showing the relation between air temperature and the opening of bypass door.

The operation of the air bypass door 21 of the automobile air conditioning system is best understood by reviewing FIG. 3, which is a flow chart illustrating a sequence or routine of bypass door opening control for the system control microcomputer 33. Programming a computer is a skill well understood in the art. The following description is written to enable a programmer having ordinary skill in the art to prepare an appropriate program for the system control microcomputer 33. The particular details of any such program would, of course, depend upon the architecture of the particular computer selected.

Referring to FIG. 3, after starting the air conditioning system, the first step S1 is to read signals from the switches, sensors and other devices of the air conditioning system and to provide drive circuits 48a-48e of the actuators 6, 11, 19 and 22 and the fan 7 with control signals, respectively. According to the control signals, the control doors 5, 10, 17, 18 and 21 and the fan 7 are automatically operated.

Figure 2:
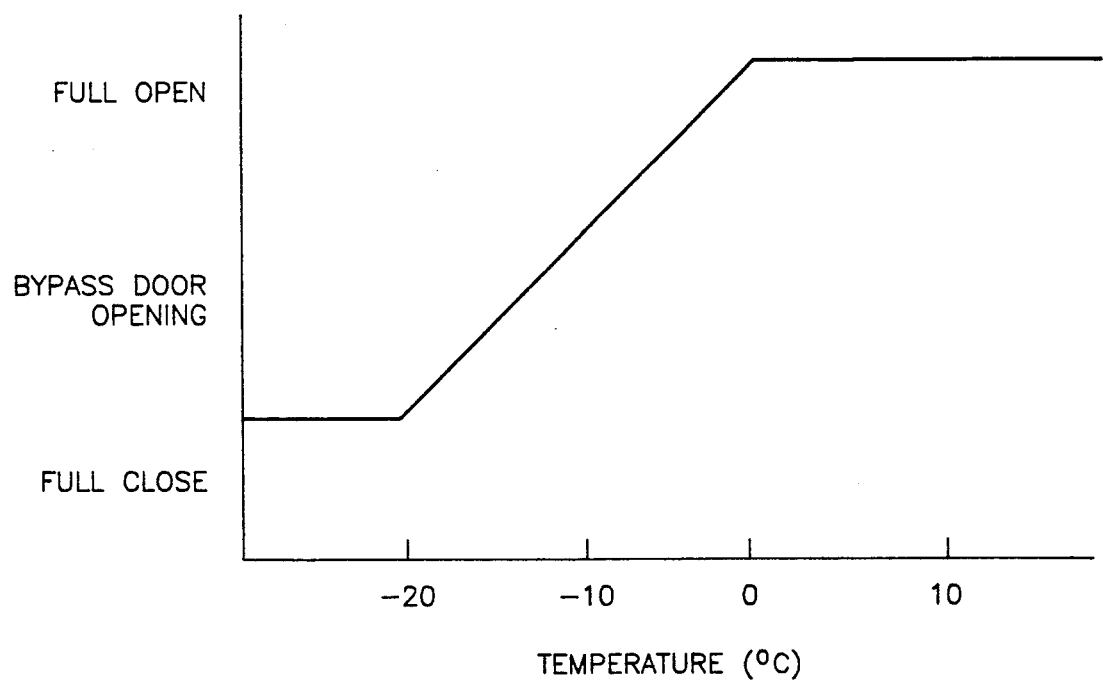
FIG. 2 is a flow chart illustrating a control routine of a control door for a microcomputer.

Thereafter, a decision is made at step S2 as to whether the mild control (M/C) switch 39a is ON. Here, a yes answer indicates that there is a demand on the part of an occupant or occupants to place the air conditioning system in the mild control mode of temperature regulation, in which the flow rate of cold air towards the head region of interior 15 can be regulated automatically, according to the temperature of air in the air bypass passage. If the answer to the decision is yes, the temperature Ta of external air is read, based on an output signal from the exterior temperature sensor 27, at step S3, to make a decision, at step S4, as to whether or not the temperature Ta of external air is higher than zero (0) degrees centigrade. If the temperature Ta of external air is actually equal to or lower than zero (0)

degrees centigrade, the opening of the bypass door 21 is determined according to the temperature Ta of external air at step S5. A proper opening of the bypass door 21 is read from a predetermined door opening control line, or map, shown in FIG. 2 to output a door opening control signal ST to the drive circuit 48d at step S6. The drive circuit 48d drives the actuator 22 according to the door opening control signal ST so as to open the bypass door 21 to the determined opening.

If, as a result of the decision at step S4, the exterior temperature sensor 27 detects the temperature Ta of external air to be higher than zero (0) degrees centigrade, a decision is made at step S7 as to whether the air conditioning (A/C) switch 41 for effecting a refrigeration cycle is in its ON state, based on the output signal from the air conditioning (A/C) switch 41. If the answer to the decision is no, this indicates that no refrigeration cycle is required. Then, the bypass door 21 is controlled to open to the opening determined according to the temperature Ta of external air through steps S5 and S6.

If the answer to the decision at step S7 is yes, this indicates that the air conditioning (A/C) switch 41 for effecting a refrigeration cycle is in its ON state, and the refrigeration cycle is required. Then, the temperature Te of evaporated air delivered from the evaporator 8 is determined at step S8, based on an output signal from the evaporator output temperature sensor 29. After the determination of the temperature Te of the evaporated air, a proper opening of the bypass door 21 is read, according to the temperature of Te of evaporated air, at step S9 from the door opening control map shown in FIG. 2 to output a door opening control signal ST to the drive circuit 48d at step S6. The drive circuit 48d drives the actuator 22 according to the door opening control signal ST so as to open the bypass door 21 to the proper opening.

Consequently, according to the temperature of intake air introduced into the bypass passage 20, the bypass door 21 is controlled to an opening which is smaller when the temperature of the bypass air is lower and larger when the temperature of the bypass air is higher. As is understood from FIG. 3, the bypass door 21 is placed in the fully open position when the temperature of the bypass air is equal to or higher than zero (0) degrees centigrade and in a predetermined small opening position when it is equal to or lower than −20 degrees in centigrade. The temperature regulating dial 39b changes, upward and downward, the temperature range of 0 to −20 degrees centigrade during the mild control mode described above.

If the answer to the decision at step S2 is no, this indicates that the mild control switch 39a is not in the ON state. The bypass door 21 is, therefore, operated in automatic air conditioning mode (A/C MODE) at step S10.

In operation of the automobile air conditioning system 1 according to the preferred embodiment of the present invention shown in FIG. 1, when the mild control switch 39a is not pushed-on or pushed-off for the mild control mode during the automatic air conditioning mode which is established by turning on the automatic air conditioning (AUTO) switch 43 on the control panel 37, the system control microcomputer 33 reads in signals representative of the temperatures T, Tr, Trh Ta and Ts from the air conditioning temperature setting device 38, interior temperature sensor 25, head temperature sensor 26, exterior temperature sensor 27 and solar radiation detector 28, respectively, through the multiplexer 31 and A/D converter 32. The microcomputer 33 provides the driver circuits 48a–48e with control signals based on these temperature signals so as to control the air mixing door 10, the evaporator 8 and the mode control doors 16, 17 and 18, thereby placing the air conditioning system 1 into the automatic air conditioning mode in an air flow mode corresponding to a heat load of the interior of vehicle. During the automatic air conditioning mode, the air conditioning system provides the occupants with the ordinary cool-head warm-feet air conditioning state.

When there is a desire to lower the temperature of air blowing in the head region of interior 15 during the automatic air conditioning mode, the mild control switch 39a of the head temperature control device 39 is pushed on for the mild control mode. As a result, as was previously described, the opening of the bypass door 21 is controlled to regulate the temperature and quantity of the air blowing off from the vent outlet 13 according to either the temperature Ta of the air to be introduced into the bypass passage 20 or the temperature Te of the air cooled by the evaporator 8 in the bypass passage 20. In short, when the bypass door 21 is changed over from the automatic control mode to the mild control mode, the air conditioning system 1 blows off mild air, which is not extremely cool, towards the head region of the vehicle interior. The temperature of the air from the vent outlet 13 is further regulated by the temperature regulation dial 39b so as to increase or decrease and provide the occupants with the best feeling of air flow against their heads.

Even when pushing on the mild control switch 39a in a state in which the automatic air conditioning (AUTO) switch 43 is not turned on and the mild control switch 39a is not pushed on, i.e., in a state in which the air conditioning system 1 is in a manual air conditioning mode and the bypass door 21 is fully closed, the bypass door 21 is controlled to change its opening in accordance with the temperature of air introduced into the bypass passage 20. Accordingly, the air conditioning system does not suddenly blow off a large quantity of cool air from the vent outlet 3 towards the occupants' heads, so that the occupants experience no discomfort.

In the manner described above, the air conditioning system of the present invention, when the mild control switch 39a is pushed on, prevents the air blowing off towards the occupants' heads from suddenly changing temperature, so that the occupants do not experience any discomfort and are provided with cool air at a desired temperature.

In the air conditioning system of the preferred embodiment of the present invention, although the bypass door 21 is fully open when the temperature of air flowing through the bypass passage 20 is zero degrees in centigrade or above and is kept at a predetermined small opening when it is −20 degrees centigrade or below, the critical temperatures may be changed according to design demands. For example, the bypass door 21 may be fully closed for temperatures of −20 degrees centigrade and below.

It is to be understood that although the present invention has been described with respect to a preferred embodiment thereof, various other embodiments and variants are possible which fall within the scope and spirit of the invention, and such other embodiments and variants are intended to be covered by the following claims.

What is claimed is:

1. An automobile air conditioning system having an air passage with a vent air outlet which blows off air regulated by cooling means and heating means to a required outlet air temperature into an interior of a car body and a bypass air passage for directing air, before heating, to the vent air outlet, comprising:

means for automatically controlling an opening formed by a bypass door, disposed in the bypass air passage, and said bypass air passage, according to a desired air conditioning temperature in an automatic air conditioning mode;

temperature detecting means for detecting the temperature of air to be introduced into the bypass air passage;

at least one mode changing manual switch for changing control of the bypass door from the automatic air conditioning mode to a specific control mode; and control means for controlling the opening formed by the bypass door and the bypass air passage so as to become smaller as a temperature detected by said temperature detecting means becomes lower, in a predetermined range of temperatures, when said at least one mode changing manual switch selects said specific control mode.

2. An automobile air conditioning system as recited in claim 1, wherein said predetermined range of temperatures is between −20 and 0 degrees centigrade.

3. An automobile air conditioning system as recited in claim 2, wherein said control means causes said bypass door to fully open when said temperature detecting means detects a temperature of 0 degrees centigrade.

4. An automobile air conditioning system as recited in claim 2, wherein said control means causes said means for automatically controlling the opening to close the opening to a predetermined opening when said temperature detecting means detects temperatures lower than −20 degrees centigrade.

5. An automobile air conditioning system as recited in claim 2, wherein said control means causes said bypass door to fully close when said temperature detecting means detects a temperature of −20 degrees centigrade.

6. An automobile air conditioning system as recited in claim 1, further comprising temperature controlling means for changing said predetermined range of temperatures during said specific control mode.

7. An automobile air conditioning system as recited in claim 1, wherein said temperature detecting means comprises a temperature sensor for detecting the temperature of air outside the car body.

8. An automobile air conditioning system as recited in claim 1, wherein said temperature detecting means comprises a temperature sensor for detecting the temperature of air after cooling.

9. An automobile air conditioning system as recited in claim 1, wherein outlet air temperature is controlled based on at least a manually set air conditioning temperature, a car interior temperature, and a temperature near a roof of the car.

* * * * *